(12) United States Patent
Pauwels

(10) Patent No.: US 7,352,695 B2
(45) Date of Patent: Apr. 1, 2008

(54) SWITCH AND A SWITCHING METHOD

(75) Inventor: Bart Joseph Gerard Pauwels, Tessenderlo (BE)

(73) Assignee: ALCATEL, Paris (FR)

( * ) Notice: Subject to any disclaimer, the term of this patent is extended or adjusted under 35 U.S.C. 154(b) by 825 days.

(21) Appl. No.: 09/778,764

(22) Filed: Feb. 8, 2001

(65) Prior Publication Data

US 2001/0030974 A1    Oct. 18, 2001

(30) Foreign Application Priority Data

Feb. 28, 2000    (EP) .................................. 00400552

(51) Int. Cl.
*H04J 1/16* (2006.01)
*H04J 3/14* (2006.01)
*H04J 3/18* (2006.01)
*H04L 1/00* (2006.01)
*H04L 12/26* (2006.01)
*H04L 12/28* (2006.01)
*H04L 12/56* (2006.01)

(52) U.S. Cl. ...................... 370/230; 370/414; 370/418; 370/465; 370/477

(58) Field of Classification Search ......... 370/412–416
See application file for complete search history.

(56) References Cited

U.S. PATENT DOCUMENTS

| 5,487,061 | A | * | 1/1996 | Bray ............................ 370/252 |
| 5,497,371 | A | * | 3/1996 | Ellis et al. ................... 370/412 |
| 5,557,608 | A | * | 9/1996 | Calvignac et al. ........... 370/389 |
| 5,619,647 | A | * | 4/1997 | Jardine ........................ 709/240 |
| 5,677,906 | A | * | 10/1997 | Hayter et al. ................ 370/235 |
| 5,802,051 | A | * | 9/1998 | Petersen et al. ........ 370/395.42 |
| 5,859,856 | A | | 1/1999 | Oskouy et al. |

OTHER PUBLICATIONS

Naoya Watanabe, et al.: "A Preemptive Packet Transfer Scheme with Virtual Cells in a Long Packet" Electronics & Communications in Japan, Part I—Communications, US, Scripta Technica. New York, vol. 71, No. 2, Feb. 1, 1988, pp. 71-80, XP000023738, ISSN: 8756-6621.

* cited by examiner

*Primary Examiner*—Daniel J. Ryman
(74) *Attorney, Agent, or Firm*—Sughrue Mion, PLLC

(57) ABSTRACT

A switch at a transmission end of a system including a number of memory devices defining queues for receiving traffic to be switched, each queue having an associated predetermined priority classification, and a processor for controlling the transmission of traffic from the queues. The processor transmits traffic from the higher priority queues before traffic from lower priority queues. The processor monitors the queues to determine whether traffic has arrived at a queue having a higher priority classification than the queue from which traffic is currently being transmitted. The processor suspends the current transmission after transmission of the current minimum transmittable element if traffic has arrived at a higher priority queue, transmits traffic from the higher priority queue, and then resumes the suspended transmission. At a receiving end, a switch that includes a processor separates the interleaved traffic into output queues for reassembly of individual traffic streams from the data stream.

21 Claims, 4 Drawing Sheets

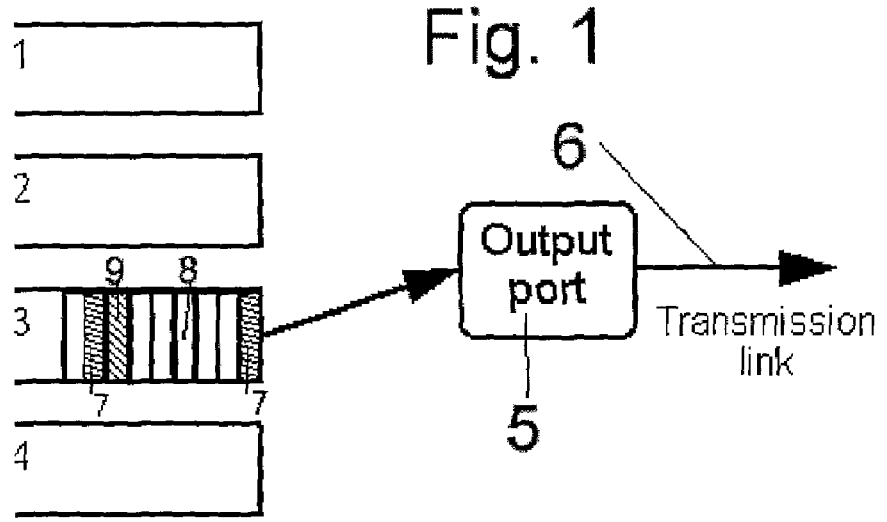
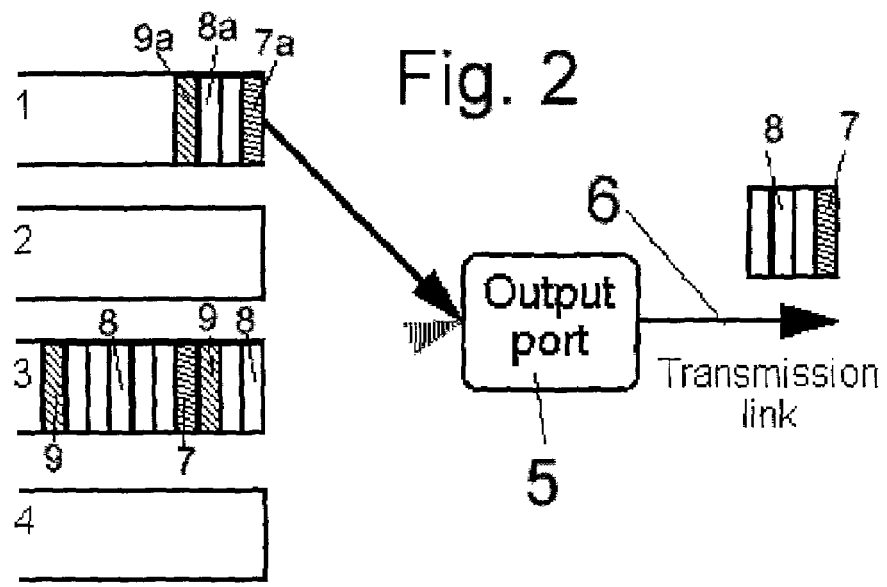
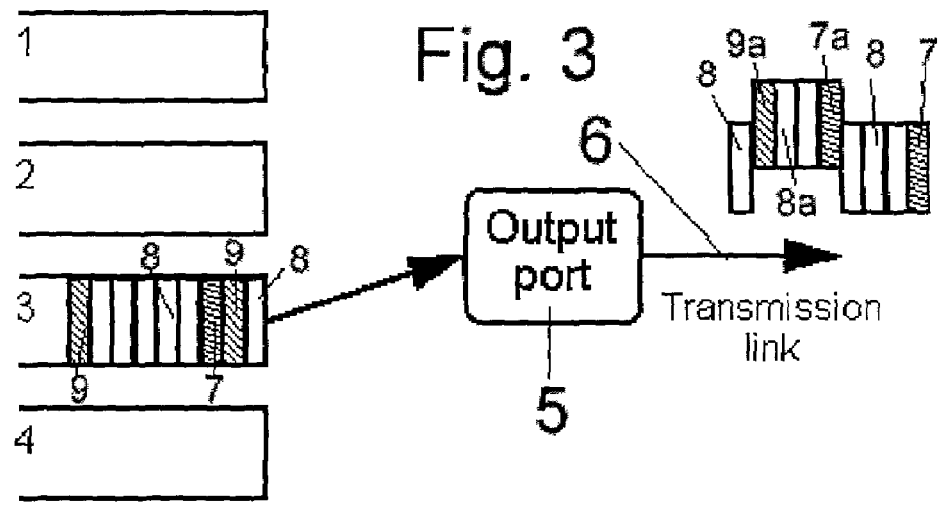

SWITCH AND A SWITCHING METHOD

BACKGROUND OF THE INVENTION

The present invention relates to a priority-enabled switching apparatus and method for use in data communication networks and in particular, to a switching apparatus and method capable of multiple priority switching.

In data communication networks, in particular local area networks (LANs) and wide area networks (WANs), the network infrastructure is built using equipment such as hubs and switches which link terminals to a network backbone and telecommunications links, thereby allowing the terminals to communicate with each other by some direct or indirect link, dependent on the network topology. Data is transmitted across networks as a series of packets. Packets are generated by a source such as a terminal or server attached to a port of a hub or switch and are transmitted individually across the network to a destination.

As the number of bytes to be transmitted varies for different types of traffic, several measures are used in networks to standardise packet sizes.

Small data elements may be packeted together into larger ones, of a single standard cell size and large data elements may be divided into several smaller ones of this same standard cell size.

In data network terms, a data unit referred to as a packet is part of a larger coherent information item such as a file or communication session. A packet can be of variable length, for example ranging from small packets of 40 bytes to large packets of 64000 bytes or more. Each packet carries an identifier which is used to identify the route to be used to pass the packet through the data network and a length identifier or some form of explicit start and end pattern. A data unit referred to as a cell is typically of a fixed, normally small (64 bytes), length and is part of a coherent information item such as a packet or communication connection. Cells carry an identifier which is used to identify the route to be used to pass the cell through the data network. Cells are delineated by a cell synchronism mechanism. In certain cases, a cell's length may be variable, in which case the length of calls is explicitly defined in a variable associated with the communication. Data units referred to as slots are of small (normally around 8 bytes), fixed length and are part of a larger coherent information item such as a cell or packet. Slots do not carry an identifier. Identification is determined by a slot's payload or the payload of some preceding slot. Slots are delineated by special patterns within their payloads.

Cell size in network systems is balanced according to the requirements of the network. In particular, the following factors must be considered: the size of the cell needs to be small enough to keep the packaging delay low, to maximise the acceptable load on the transmission links between waiting queues, and furthermore, to keep the delay (variation) of high priority cells caused by low priority cells low. Since the physical memory containing the queues has a given, finite size, the smaller the elements in the queue, the more can fit in the same memory, and the higher the load on the outgoing transmission link of the queue will be, thereby improving the efficiency of the system. On the other hand, cell size needs to be large enough for transport efficiency. In addition, the segmentation of information blocks for switching into smaller chunks, each with their own segmentation overhead, creates additional overhead. The segmentation overhead includes segment delineation, segment protection, communication stream identification, communication stream maintenance and service adaptation layer information.

In the applicant's Multi-Path Self Routing system (MPSR), information is transferred in Multi-Slot Cells (MSC), allowing a certain flexibility in cell size, to adapt it better to the intrinsic nature of the information transported. This allows small cells to be used for delay sensitive services, and large cells for efficiency sensitive services. Nevertheless, the size variation remains bounded for the following reasons:

(1) The queue memory size necessary to achieve a high load on transmission links, using large cells. This limitation can be relaxed however by advances in technology, which are making it possible to increase the size of memory at ever decreasing cost.

(2) The delay incurred by incoming high priority traffic while sending a low priority cell from a queue. This delay depends on the size of the low priority MSC, which cannot be too large in order not to disturb any higher priority MSC flow by too much. Alleviation of this limitation is harder to achieve since it would require an increase in memory speed and MSC processing speed.

As it is transmitted, each packet is given a destination address in a header field. When a data packet arrives at a switching unit it is examined and processed according to the programming of the switching unit. Switches map the addresses of attached terminals and then only allow necessary traffic to pass through the switch.

A switch typically includes at least 2 input/output ports and at least one processor. Whilst there may be physically separate input and output ports for each terminal or link these are commonly shown as one port. Each port has an associated queue in a memory in which packets received from or to be transmitted to the port are held. Packets arriving at an input queue of a switch wait in turn for a processor to determine the appropriate output queue, if any, before being passed to that queue.

Prioritised switching is often implemented in the form of Quality of Service (QoS) policies. By temporarily storing packets for non-delay sensitive communication in switching elements or network nodes until transmission capacity is no longer needed by higher priority communication packets, and is thus available for the lower priority packets, problems associated with congested data networks are often eased. However, even with the preferred transmission of high priority cells from a waiting queue over a transmission link, once transmission of a low priority cell is started, any new arriving high priority cells have to wait until the full low priority cell is gone, before they can benefit from their high priority status for getting access first to the transmission resource.

SUMMARY OF THE INVENTION

According to a first aspect of the present invention, there is provided a switch comprising a number of memory devices defining queues for receiving traffic to be switched, each queue having an associated predetermined priority classification, and a processor for controlling the trarismission of traffic from the queues to an output, the processor being configured to transmit traffic from the higher priority classified queues before traffic from lower priority classified queues, the traffic having a predetermined minimum transmittable element such as any one of a slot and a bit, wherein the processor is configured to monitor the queues to determine whether traffic has arrived at a queue having a higher priority classification than the queue from which traffic is currently being transmitted, the processor being responsive to suspend the current transmission after transmission of the current minimum transmittable element if traffic has arrived at a higher priority classified queue and thereafter transmit traffic from that queue, and subsequently resume the suspended transmission.

The predetermined minimum transmittable element need not be a complete cell or packet. Indeed, by interrupting transmissions prior to the completion of a cell or packet the present invention offers quick, efficient switching of higher priority data elements without having to wait for currently transmitting large cells or packets to complete. Once the interrupting transmission has completed, the transmission of the unfinished cell or packet can be immediately resumed from the point at which it was interrupted.

The minimum transmittable element for traffic of asynchronous and bit-synchronous protocols is a bit whilst the minimum transmittable element for traffic of slot-synchronous protocols is a slot.

In operation, the switch operates as closely as possible to an ideal model of a switching system for multiple priority information streams: higher priority cell flows are switched as if no load of lower priority cells exists. The Quality of Service characteristics for higher priority cell streams not at all affected by the presence of any load of lower priority cells.

When the interrupt delay is small enough, of the order of a number of bits, this behaviour approaches the ideal mentioned above for a multiple priority cell switching matrix or network, irrespective of the load and (possibly large) size of low priority cells or packets.

The impact on the queuing delay of higher priority cells or packets by the presence of preceding lower priority cells or packets is reduced from a full cell or packet duration in other solutions to the duration of maximum one bit or composing slot of the lower priority cell or packet.

The delay characteristics, and acceptable load or required queue size characteristics for transfer of small, high priority cells or packets are no longer dependent on, and can be engineered without taking into account the presence of, larger, lower priority cells or packets in a mixed environment.

Preferably, the processor is configured to adapt traffic received from the queues to include one or more reassembly indicators, where not already present.

In order to properly operate, the present invention requires cell or packet based transmission with some form of explicit cell or packet start indication. By this is meant a delineation pattern that, by definition, cannot occur in a correct bitstream on a transmission line, not even with very low probability. In addition, an explicit means is needed for detection of the end of the interrupting higher priority cell or packet, and thus the resumption of the interrupted lower priority cell or packet. Certain types of cell or packet based transmissions inherently satisfy these criteria. A preferred feature of the present invention is that data traffic to be transmitted is monitored for the absence of the required delineation pattern and means of detecting the end of the data element and where such an absence is detected, the traffic is adapted to include the missing elements by the addition of one or more reassembly indicators. The addition of reassembly indicators, where necessary, permits the present invention to be applicable to many transmission types that it would otherwise be incompatible with.

Reassembly indicators may include different start and end indicators for each cell or packet in the traffic or start and length indicators for each cell or packet. Preferably, the processor is configured to adapt traffic received from the queues to include an indication of the queue's priority classification, in which case the processor may also be configured to adapt each packet or cell in the traffic received from the queues to include an indication of the queue's priority classification. The priority indicator may serve as a reassembly indicator, a change in priority at the receiving end indicating the previous transmission has either ended or been interrupted. The inclusion of the priority classification offers a simple yet reliable and robust mechanism from which individual packets or cells from a data stream of interleaved, interrupted and subsequently resumed, packets or cells can be reassembled.

The processor may be configured to store predetermined details of interrupted traffic transmissions and their respective queues in one of the memory devices and to retrieve the details for use in resuming the interrupted transmission once the interrupting transmission is completed.

The switch may include a number of outputs, wherein the processor is configured to transmit traffic to an appropriate output in dependence on the traffic's destination address.

According to another aspect of the present invention, there is provided a switch comprising an input from which a data stream is received, the data stream comprising interleaved portions of traffic, a number of output queues and a processor, wherein the processor is configured to separate the interleaved traffic into respective ones of the output queues for reassembly of individual traffic streams from the data stream.

The processor may be configured to monitor traffic, passing it to an output queue until it detects a start indicator within the data stream, wherein the processor is configured to pass subsequent traffic to a further output queue until the end of an interleaved portion of traffic is determined, thereafter the processor is configured to pass subsequent traffic to the prior output queue, or until a further start indicator is detected within the data stream, wherein the processor is configured to pass subsequent traffic to a further output queue.

The end of an interleaved portion of traffic may be determined in dependence on a portion length indicator within the interleaved portion of traffic or from the detection of an end indicator within the data stream.

Each interleaved portion of traffic may include a priority indicator, wherein the end of an interleaved portion of traffic is determined from a drop in level of the priority indicator.

Each interleaved portion of traffic may include a priority indicator, wherein a start indicator comprises a rise in the level of the priority indicator.

Preferably, the processor is configured to operate as state machine.

According to another aspect of the present invention, there is provided a method of transmitting data traffic having a predetermined minimum transmittable element such as any one of a slot and a bit and being received from a number of prioritised sources comprising the steps of:

(a) setting the highest priority source with data traffic waiting for transmission as current transmission source;

(b) transmitting the data traffic from the current transmission source until completion whilst monitoring the sources for waiting traffic, wherein if traffic is detected from a source with a higher priority than the current transmission source going to step (d);

(c) upon completion, going to step (a); and, (d) completing transmission of the current minimum transmittable element and going to step (a).

Preferably, step (b) comprises the further steps of adapting the data traffic before transmission to include, where not already present, one or more reassembly indicators for use in reassembling the data traffic upon receipt.

According to a further aspect of the present invention, there is provided a method of reassembling a number of traffic streams interleaved within a data stream into a respective output queue for each traffic stream comprising the steps of:

(a) clearing the output queues and selecting a first output queue for receiving the data stream;

(b) passing the data stream to the selected output queue whilst monitoring the data stream, going to step (c) upon detection of a start indicator and going to step (d) if the end of a traffic stream is determined;

(c) selecting a further output queue to receive the data stream and going to step (b);

(d) if the memory stack contains one or more identifiers of output queues, retrieving the top identifier from the queue, selecting the output queue corresponding to the identifier to receive the data stream and going to step (b), going to step (a) otherwise.

BRIEF DESCRIPTION OF THE DRAWINGS

An example of the present invention will now be described in detail with reference to the accompanying drawings, in which:

FIG. 1 is a representation of a switch including a number of input queues to be processed according to the present invention;

FIG. 2 is the representation of the input queues of FIG. 1 during priority switching;

FIG. 3 is the representation of the input queues of FIGS. 1 and 2 after priority switching;

DETAILED DESCRIPTION OF THE INVENTION

Figure 4:
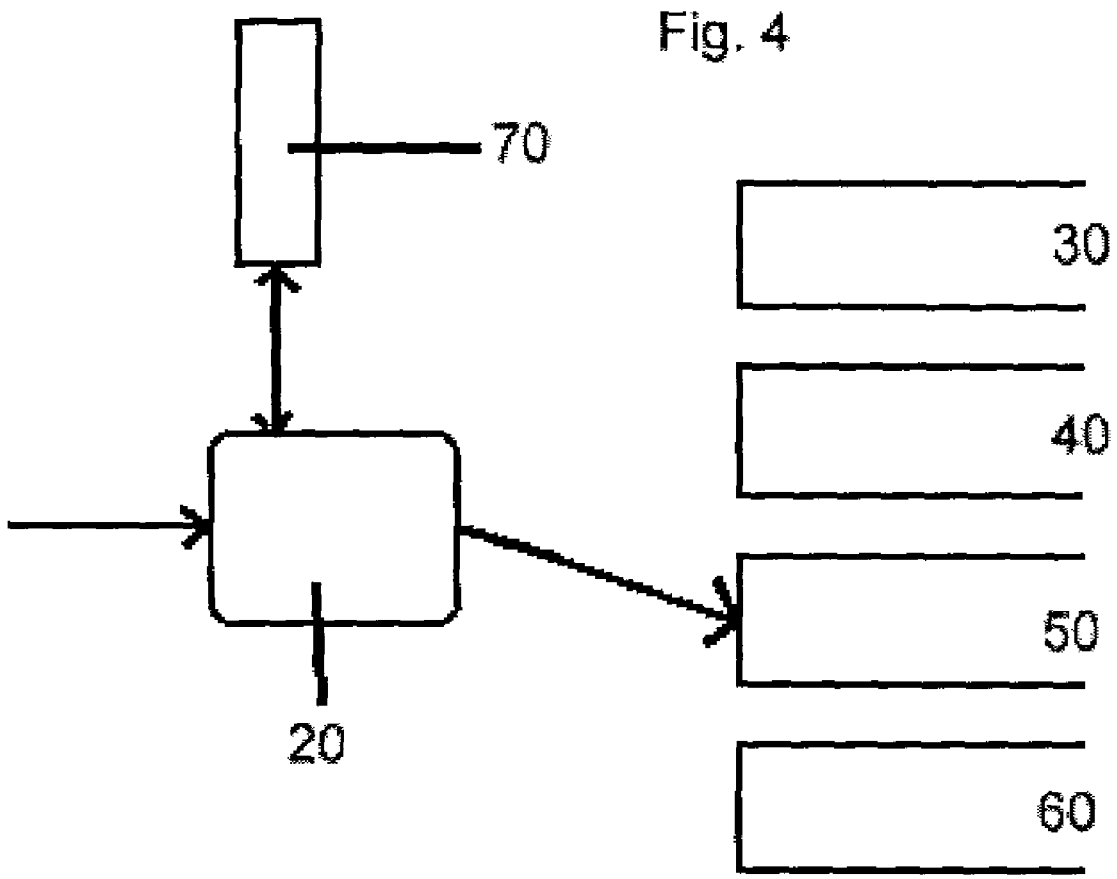
FIG. 4 is a representation of a switch receiving interrupted prioritised traffic to be processed according to the present invention; and, FIGS. 5 and 6 are simplified state transition diagrams representing state machines for use in processing received data according to the present invention.

FIG. 1 is a representation of part of a switch including a number of input queues to be processed according to the present invention. Traffic, in the form of data elements such as slots, is received at queues 1-4. Queue 1 is predetermined to receive the highest priority switching treatment whilst queue 4 receives the lowest priority switching treatment. A processor (not shown) monitors traffic arriving at the queues to control the switching of traffic to an output port 5 which is connected to a transmission link 6.

A traffic stream received at queue 3 includes a start slot 7, a number of body slots 8 and an end slot 9. As there is no higher priority traffic waiting in other queues to be transmitted, the processor switches the traffic in queue 3 to the output port 5 starting with start slot 7, followed by body slots 8 and end slot 9.

However, if during transmission of the slots, traffic 7a-9a arrives at queue 1, it is detected by the processor. As the queue 1 is entitled to higher priority switching treatment than queue 3, the transmission from queue 3 is immediately interrupted and replaced by switching of traffic from queue 1, as is shown in FIG. 2.

Once the processor determines that all of the interrupting higher priority traffic has been switched to output port 5, it resumes switching of the traffic 7-9 from queue 3, as is shown in FIG. 3.

During transmission of a cell, slot or packet from one of the queues, all higher priority queues, starting with the highest, are monitored for arrival of new cells, slots or packets. If such an arrival occurs, the current transmission of a lower priority data element is stopped at the earliest possible point. The earliest possible point is normally once a currently pending transmission of a predetermined minimum transmittable element has been completed. For an asynchronous or bit synchronous protocol, the minimum transmittable element is a bit. For a slot synchronous protocol, it is a slot. If necessary, it is recorded in a memory from which queue a packet was being transmitted, and up to which point the transfer of this packet was completed. The new cell, slot or packet is started on the transmission line, and continued until it is finished, or until a cell, slot or packet arrives in a queue with even higher priority. After finishing the transmission of the higher priority cells, slots or packets, in the event that no other arrivals in the same or higher priority queues occur, the transmission of the next bit or slot of the interrupted lower priority cell or packet is resumed.

At the receiving side of the transmission line is a switch element with the reverse configuration of that of FIG. 1. A receiver switch element is shown in FIG. 4. The switch element uses its processor (not shown) to determine the start of a new cell, slot or packet, and its priority. This priority can be available explicitly in the first slot indication, in the cell or packet header, or be related implicitly to the cell identification. Both of these indications are fed into an input priority state machine 20 which is used to determine whether another cell or packet transmission was previously ongoing, i.e. was interrupted, and whether the interrupted cell or packet, if any, had a lower priority than the new one. The state machine then determines whether the start of a new cell or packet is acceptable, and activates transfer of the new cell or packet to an internal arrival queue 30-60 with appropriate priority, where the cell or packet waits, pending the routing decision, or it decides that the cell or packet is illegal, and generates an exception.

If it is determined that the new start is acceptable, the routing and queueing information for the interrupted cell or packet are pushed onto a memory stack 70, and the routing logic is restarted for the new cell or packet. Upon detection of the end of the interrupting cell or packet, the state machine 20 reverts back to the previous state by retrieving the routing and queueing logic for the previous lower priority cell or packet from the memory stack 70, and resumes its processing.

The present invention is applicable to following types of data packets or cells without modification:

Asynchronous cells or packets with explicit start flag and explicit end flag or explicit length indicator in its header;

Bit synchronous cells or packets with explicit start flag and explicit end flag or explicit length indicator in its header; and, Slot synchronous Multi-Slot Cells or packets with an explicit first slot indication and explicit last slot indicator or an explicit length indicator.

Unfortunately, some communications protocols do not lend themselves to the present invention. In the case of HDLC (High-level Data Link Control), whilst the start flag ('01111110') could occur at any bit position, and unambiguously and instantaneously identifies the beginning of a new packet, which should have higher priority if it starts before the previous one ended correctly, the end flag pattern is also ('01111110') and the pattern can therefore occur at the end or beginning of a cell or packet, and will unambiguously and instantaneously identify the end of the high priority packet. However, the pattern does not indicate whether the next bit belongs to the interrupted low priority cell or packet, or to another newly started cell or packet which has the same higher priority as the previous one. To correct this and allow the present invention to be applicable to such communication protocols, an End flag pattern different from the Start flag pattern is added to cells or packets.

Whilst Multi-Slot Cells as defined for the MPSR fulfil the requirement of carrying an explicit indication of the first (header) slot, different from following (body) slots, or idle slots, there is no last slot indication, an MSC is ended by either the first slot of the next MSC, or by an idle slot. In this manner, the last slot of a higher priority MSC and the continuing body slots of the lower priority MSC cannot be distinguished from each other. In order to overcome these problems the last slot of an MSC is explicitly identified in the present invention. Mechanisms based around two alternative state machines are discussed below which are particularly applicable to multi-slot based systems such as MPSR. Comparable mechanisms, fit for asynchronous or bit synchronously transmitted cells or packets, can be easily derived by persons skilled in the art.

Figure 5:
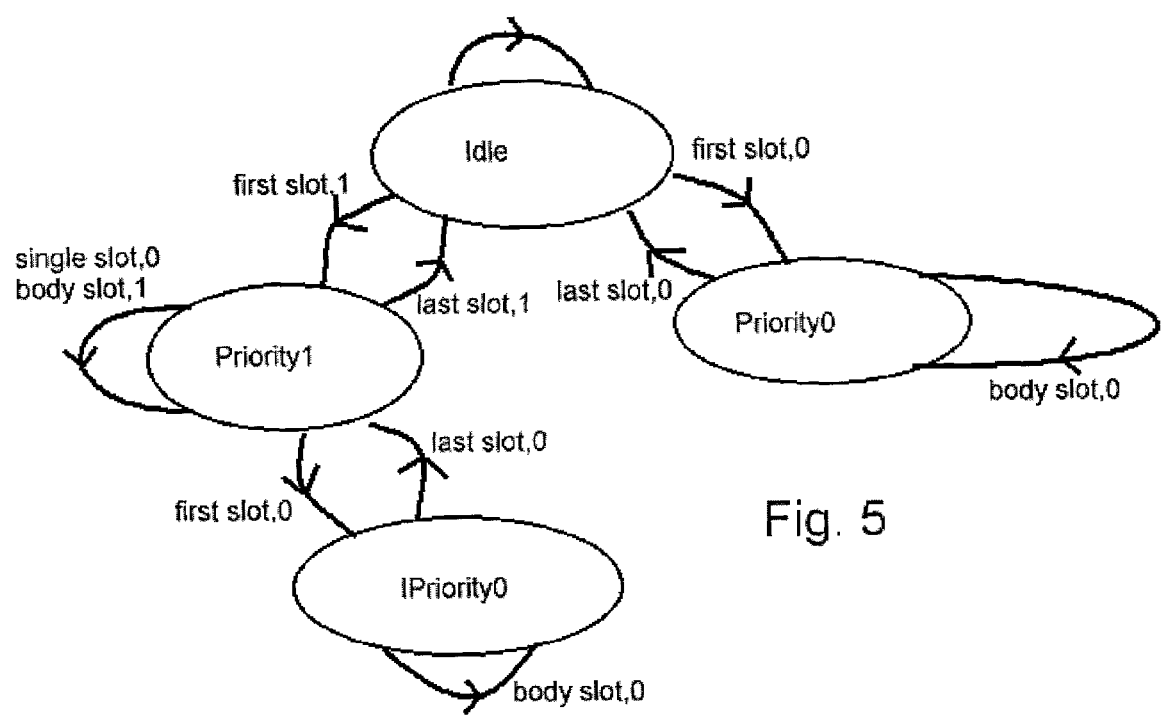

Firstly, the slot type in the slot control bit pattern may be coded along with the priority in separate bits. Idle slots are indicated as Single Slot cells or packets of the lowest priority, as these are no to be used for actual data traffic. This solution is detailed in state Table 1 below and is also shown in a simplified (no reset/error states are shown) state transition diagram of FIG. 5.

TABLE 1

| Event | | State of the receiver | | | |
|---|---|---|---|---|---|
| Slot type | Priority | Idle | Priority 1 | Priority 0 | Priority 0 |
| Single slot | 0 | Idle | Priority 1 | Reset | Reset |
| Single slot | 1 (Idle) | Idle | Reset | Reset | Reset |
| First slot | 0 | Priority 0 | IPriority 0 | Reset | Reset |
| First slot | 1 | Priority 1 | Reset | Reset | Reset |
| Body slot | 0 | Reset | Reset | IPriority 0 | Priority 0 |
| Body slot | 1 | Reset | Priority 1 | Reset | Reset |
| Last slot | 0 | Reset | Reset | Priority 1 | Idle |
| Last slot | 1 | Reset | Idle | Reset | Reset |

Figure 6:
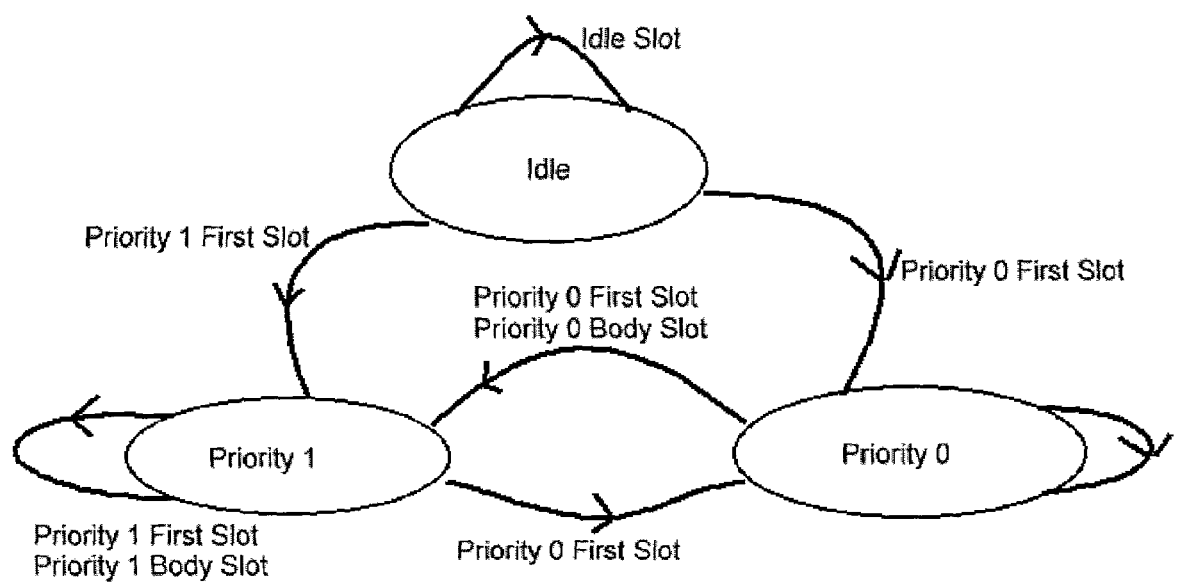

The alternate solution codes slot type as well as priority in each slot control bit pattern, as is detailed in state Table 2 below and is also shown in corresponding simplified (no reset or error states are shown) state transition diagram of FIG. 6.

TABLE 2

| Event | State of the receiver | | |
|---|---|---|---|
| Slot type | Idle | Priority 1 | Priority 0 |
| Idle slot | Idle | Idle | Idle |
| Priority 0 first slot | Priority 0 | Priority 0 | Priority 0 |
| Priority 0 body slot | Reset | Reset | Priority 0 |
| Priority 1 first slot | Priority 1 | Priority 1 | Priority 1 |
| Priority 1 body slot | Reset | Priority 1 | Priority 1 |

1 pattern is needed for indicating Idle slots, and 2 patterns are needed per priority, one for first slots, and one for subsequent slots of the same multiple slot cell or packet. RESET means return to the Idle state, with an error indication.

Whilst the present invention has been described with respect to a switching system in which a number of input queues are switched onto a single transmission line (in effect operating as a router), the skilled reader will appreciate that the present invention is equally applicable to the switching of traffic onto a number of transmission lines or output ports.

While the principles of the invention have been described above in connection with specific apparatus, it is to be clearly understood that this description is made only by way of example and not as a limitation on the scope of the invention, as defined in the appended claims.

The invention claimed is:

1. A method of transmitting data traffic received from a plurality of prioritized sources, wherein the method comprises:
   (a) setting the highest priority source with data traffic waiting for transmission as a current transmission source;
   (b) transmitting the data traffic from the current transmission source until completion while monitoring the remaining sources for waiting data traffic, wherein if traffic is detected from a source with a higher priority than the current transmission source, completing transmission of a minimum transmittable element from the current transmission source prior to starting transmission of data traffic from the source with higher priority;
   (c) upon completion of the transmission of data traffic from the current transmission source, going to step (a), wherein the data traffic as received from said plurality of prioritized sources includes control data, and step (b) further comprises incorporating into said control data at least one reassembly indicator for use in reassembling the data traffic upon receipt, and wherein all reassembly indicators needed for reassembling the data traffic upon receipt are incorporated into said control data in such a way as to not increase the amount of said control data already present in said data traffic.

2. The method according to claim 1, in which the minimum transmittable element for data traffic of asynchronous and bit-synchronous protocols is a bit.

3. The method according to claim 1, in which the minimum transmittable element for data traffic of slot-synchronous protocols is a slot.

4. A computer program product comprising a number of computer executable instructions for executing the steps of claim 1.

5. A method of reassembling a number of traffic streams interleaved within a data stream into a respective output queue for each traffic stream, wherein the method comprises:
   (a) clearing the output queues and selecting a first output queue for receiving the data stream;
   (b) passing the data stream to the selected output queue while monitoring the data stream, and going to step (c) upon detection of a start indicator of a new traffic stream different from the traffic stream currently being received, wherein the staff indicator of the new traffic stream is located after a minimum transmittable element of the currently received traffic stream, and going to step (d) if the end of a traffic stream is determined, wherein the staff and end of said traffic streams are determined from at least one reassembly indicator incorporated into control data contained within the traffic streams without increasing the amount of control data already present in said traffic streams prior to interleaving;

(c) selecting a further output queue to receive the new traffic stream and going to step (b); and (d) if a memory stack contains one or more identifiers of output queues, retrieving the top identifier from the stack, selecting the output queue corresponding to the identifier to resume receiving said currently received traffic stream and going to step (b), otherwise going to step (a).

6. A switch comprising:

a plurality of memory devices defining queues for receiving traffic to be switched, wherein each queue is associated with a predetermined priority classification, and a processor for controlling the transmission of traffic from the queues to an output, wherein the processor monitors the queues to determine whether traffic has arrived at a queue having a higher priority classification than the queue from which traffic is currently being transmitted, and if traffic arrives in a queue that has a higher priority than the queue from which traffic is currently being transmitted, the processor suspends the current transmission after transmission of a minimum transmittable element from the lower priority queue and transmits traffic from the higher priority queue, and subsequently resumes the suspended transmission after completing transmission of the higher priority traffic, wherein the traffic received by said memory devices includes control data and, prior to transmission, the processor modifies said control data without increasing the amount of said control data to comprise whatever reassembly indicators are needed, including at least one reassembly indicator, for reassembling the traffic upon receipt.

7. The switch according to claim 6, wherein the reassembly indicators comprise different start and end indicators for each cell or packet in the traffic.

8. The switch according to claim 6, wherein the reassembly indicators comprise start and length indicators for each cell or packet in the traffic.

9. The switch according to claim 8, wherein the processor adapts each packet or cell in the traffic received from the queues to include an indication of the queue's priority classification.

10. The switch according to claim 6, wherein the reassembly indicators indicate the queue's priority classification.

11. The switch according to claim 6, wherein the processor stores predetermined details of interrupted traffic transmissions and their respective queues in one of the memory devices and retrieves the details for use in resuming the interrupted transmission once the interrupting transmission is completed.

12. The switch according to claim 6, further comprising a number of outputs, wherein the processor transmits traffic to an appropriate output depending upon the traffic's destination address.

13. The switch according to claim 6, wherein the minimum transmittable element for traffic of asynchronous and bit-synchronous protocols is a bit.

14. The switch according to claim 6, wherein the minimum transmittable element for traffic of slot-synchronous protocols is a slot.

15. A telecommunications network comprising a switch as claimed in claim 6.

16. A switch comprising an input from which a data stream is received, the data stream comprising interleaved portions of different traffic streams, a number of output queues and a processor configured to separate the data stream into respective ones of the output queues for reassembly of individual traffic streams from the data stream, wherein the processor monitors the data stream while routing a first traffic stream to a first output queue until the processor detects a start indicator of a new interleaved portion of a second traffic stream, wherein the processor routes the new interleaved portion of said second traffic stream to a second output queue until the end of the new interleaved portion of the second traffic stream is determined, thereafter the processor routes the first data stream to the first output queue, or until another start indicator of another new interleaved portion of a traffic stream is detected within the data stream, wherein the processor routes the another new interleaved portion to a third output queue, wherein said start and end of said interleaved portions of said traffic streams are determined from at least one reassembly indicator incorporated into control data contained within said interleaved portions of traffic streams in such a way as to not increase the amount of control data above the amount already included in said traffic streams prior to interleaving.

17. The switch according to claim 16, in which the end of an interleaved portion of traffic is determined in dependence on a portion length indicator within the interleaved portion of traffic.

18. The switch according to claim 16, in which the end of an interleaved portion of traffic is determined from end indicator within the data stream.

19. The switch according to claim 16, in which each interleaved portion of traffic comprises a priority indicator, wherein the end of an interleaved portion of traffic is determined from a drop in level of the priority indicator.

20. The switch according to claim 16, in which each interleaved portion of traffic comprises a priority indicator, wherein a start indicator comprises a rise in the level of the priority indicator.

21. The switch according to claim 16, in which the processor operates as a state machine.

* * * * *